July 19, 1949.  A. GREINER  2,476,658
GLASS TUBE BENDING APPARATUS
Filed March 30, 1946  2 Sheets-Sheet 1

Inventor:
Alfred Greiner,
by John H Anderson
His Attorney.

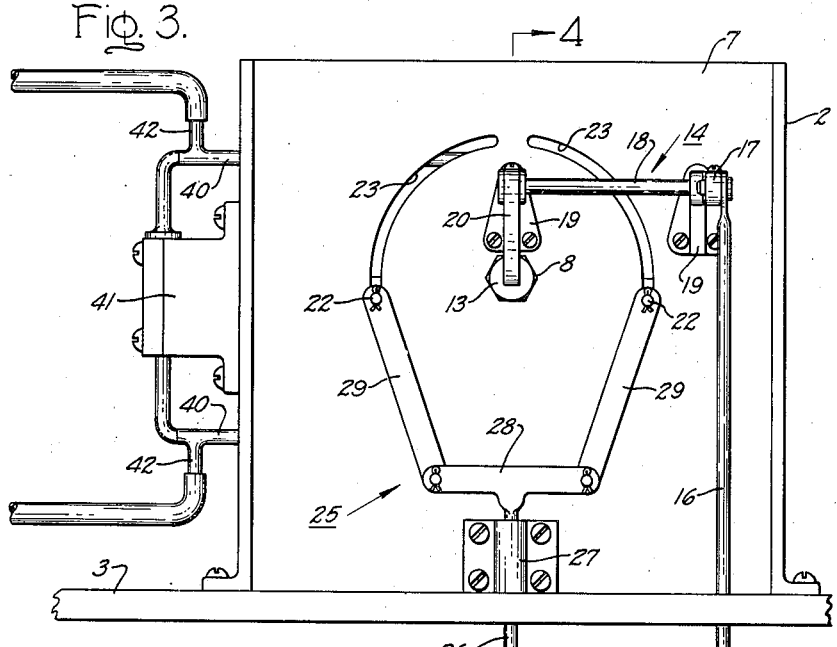
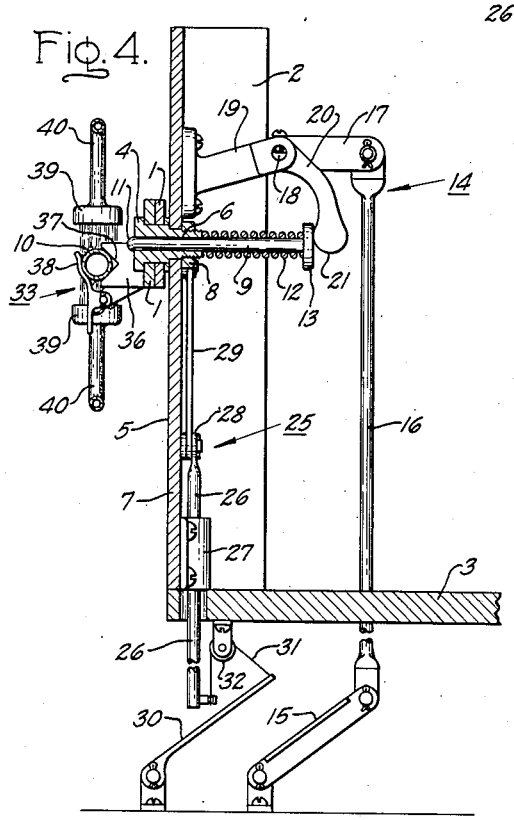
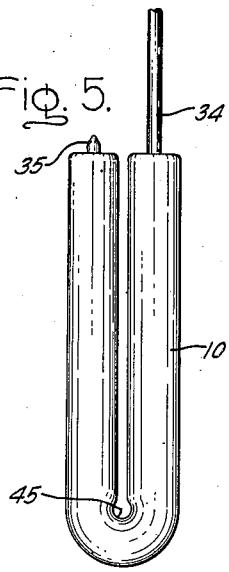

Patented July 19, 1949

2,476,658

UNITED STATES PATENT OFFICE 2,476,658

GLASS TUBE BENDING APPARATUS

Alfred Greiner, Cleveland Heights, Ohio, assignor to General Electric Company, a corporation of New York Application March 30, 1946, Serial No. 658,506

6 Claims. (Cl. 49—7)

My invention relates to apparatus for bending glass tubing and more particularly to apparatus for forming an angular bend in a glass tube. The apparatus is particularly useful in the formation of U-shaped tubes such as are used to form the envelopes of certain types of electric discharge devices, such as germicidal lamps, for instance.

The bending of glass tubes into U-shape, when performed by hand, ordinarily requires the services of a highly skilled glass worker. This is particularly true where it is desired to obtain U-tubes of uniform final shape. Such hand bending of glass tubes, however, besides being slow and difficult, is also a costly operation. Moreover, where the glass tubes are to be bent into U-tubes of the type having a very sharp bend, i. e., with their legs extending closely alongside one another, the glass at the inner side of the bend is apt to buckle or corrugate during the bending operation because of the excessive compression to which it is subjected during such operation.

One object of my invention is to provide apparatus for forming an angular bend in glass tubes and the like by means of which such tubes may be quickly and accurately bent into uniform shape without collapsing of the tube at the point of bend.

Another object of my invention is to provide apparatus of the above type for bending glass tubes into uniform U-shape, and particularly into U-tubes, having a very sharp bend, without buckling the glass at the inner side of the bend.

Still another object of my invention is to provide apparatus of the above type which is simple and inexpensive and which will not require skilled labor to operate.

Figure 1:
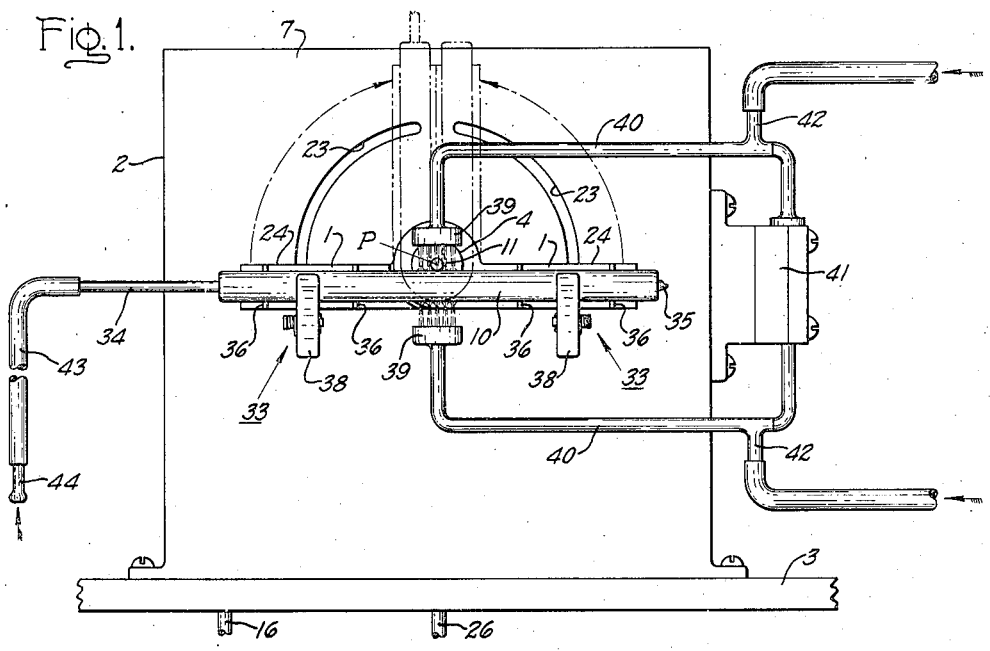
Figure 2:
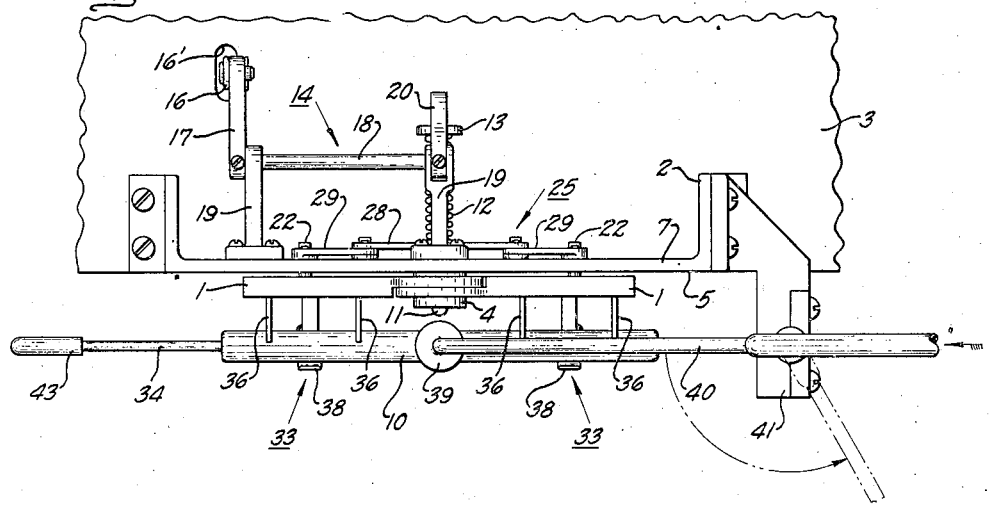

Further objects and advantages of my invention will appear from the following description of a species thereof and from the accompanying drawing in which:

Fig. 1 is a front elevation of apparatus comprising my invention; Fig. 2 is a plan view thereof; Fig. 3 is a rear elevation of the apparatus; Fig. 4 is a vertical section on line 4—4 of Fig. 3; and Fig. 5 is an elevation of the finished glass U-tube formed by the apparatus comprising my invention.

Referring to the drawings, the apparatus there shown comprises a pair of swivel arms 1, 1 pivotally mounted on an upstanding channel-shaped support bracket 2 fastened to the table portion 3 of a bench or stand. The swivel arms 1 are pivoted at one end on a headed stud 4 projecting from the front face 5 of the bracket 2 and provided with an axial bore 6 extending therethrough. The said stud 4 extends through the bracket wall 7 and is fastened thereto in any suitable manner, as by a nut 8 threaded onto the projecting rear end portion of the stud.

Extending through and reciprocable within the bore 6 is a forming pin 9 around which the glass tube 10 is bent during the operation of the apparatus. The said pin 9 is preferably made of a suitable material, such as stainless steel for instance, which will not corrode when heated. The pin 9 is normally held in a retracted or back position, with its front end 11 nearly withdrawn into the stud 4, by the expansive force of a compression coil spring 12 mounted on the pin and compressed between the stud 4 and a head 13 formed on the rear end of the pin. During the operation of the apparatus, the pin 9 is moved forwardly, against the resistance of the spring 12, by suitable foot-operated mechanism 14 comprising a foot pedal 15 the swinging end of which is connected, by a vertically extending connecting rod 16 extending up through an opening 16' in the table 3, to the free end of an arm 17 fastened on a horizontal shaft 18. The said shaft 18 overlies the pin 9 and is journalled in brackets 19 mounted on the rear side of the bracket wall 7. Fastened on the shaft 18 is an operating arm 20 provided with an enlarged ball-shaped end 21 which engages the rear surface of the head 13 on the forming pin 9. When the foot pedal 15 is depressed, the shaft 18 is rotated to thereby cause the operating arm 20 to push the forming pin 9 forwardly to its operative or tube bending position.

Adjacent their outer ends, the swivel arms 1 are provided with support pins 22 which project rearwardly from the arms through arcuate slots 23 which are formed in the bracket wall 7 concentric with the pivot axis P of the arms 1. The slots 23 are of sufficient arcuate extent to permit the swivel arms 1 to be swung upwardly to a vertical side-by-side position as indicated in dash-dot lines in Fig. 1. The swivel arms 1 are normally supported in positions extending horizontally away from each other by the engagement of the pins 22 with the lower ends of the slots 23. The pivot axis P of the arms 1 is offset relative to the arms so as to lie in the plane of the upper sides 24 (Fig. 1) of the said arms when they are in their normal horizontal position.

During the operation of the apparatus, the swivel arms 1 are swung upwardly about their common pivot axis P by suitable actuating mechanism 25 comprising a vertically extending rod 26 which is supported in and vertically reciprocable within a bearing 27 fastened on the rear side of the bracket wall 7. At its upper end, the rod 26 carries or is formed with a cross arm or bar 28 the opposite ends of which are connected by a pair of links 29 to the projecting rear end portions of the pins 22 on the arms 1. At its lower end, the rod 26 is connected to the free or swinging end of a foot pedal 30 by a chain, flexible wire or wire band 31 running over a pulley 32 mounted on the underside of the table 3. When the foot pedal 30 is depressed, the rod 26 is moved upwardly to cause the links 29 to push upwardly on the arm pins 22 and thus pivot or swing the arms 1 upwardly about their common pivot axis P.

Adjacent their outer end portions, the arms 1 each carry suitable holder means 33 for supporting the straight glass tube 10 which is to be bent. In the particular case illustrated, the glass tube 10 is in the form of an envelope for an electric discharge device such as a germicidal lamp, the envelope 10 being provided at its ends with outwardly extending exhaust tubes 34 and 35 one of which (tube 35) is tipped off. The holder means 33 are arranged to support the glass envelope 10 in a position extending horizontally alongside and in front of the arms 1 when the latter are in their normal lowered position, with the envelope 10 offset downwardly with respect to the pivot axis P of the arms a distance sufficient to clear the forming pin 9 when the latter is advanced to its operative or tube-bending position overlying the glass envelope.

The holder means 33 on each arm 1 comprises a pair of V-blocks or plates 36 spaced apart longitudinally of the arm and extending forwardly therefrom. The forward ends of the plates 36 are formed with V-notches 37 (Fig. 4) which are aligned longitudinally of the arm 1 and are adapted to receive the glass envelope 10 therein. Pivotally mounted on each arm 1, between the pair of V-plates 36 thereon, is a normally spring-closed clamp 38 which resiliently engages the front side of the envelope 10 to hold the envelope in place within the V-notches 37.

Mounted adjacent the front side of the bracket wall 7 is a pair of gas burners 39 for heating the envelope 10 when it is supported in place on the horizontally positioned swivel arms 1. The burners 39 are supported on opposite sides of the envelope 10 (preferably in positions directly above and below the envelope, as shown) to heat the portions of the envelope lying in and adjacent to a plane extending transversely of the envelope and including the pivot axis P of the arms 1. The burners 39 are so constructed as to heat the envelope 10 more or less uniformly therearound and are provided with rigid, metal supply pipes or conduits 40 which support the burners in place from an arm 41 mounted on and extending from the side of the bracket 2. The conduits 40 are pivotally mounted on the bracket 2 to pivot about a common vertical axis so as to enable the burners to be swung to one side (as indicated in dash-dot lines in Fig. 2) out of the path of movement of the glass envelope 10 and holders 33 when the swivel arms 1 are swung upwardly to bend the envelope. The conduits 40 are provided with connections 42 which are connected to the gas supply for the burners.

To prevent collapsing of the glass envelope 10 at the heated region thereof, air or other gas under a slight pressure may be introduced into the envelope through the open or untipped exhaust tube 34 thereof. For this purpose, one end of a length of rubber tubing 43 may be connected to the open end of the exhaust tube 34 and the other end of the tubing 43 either provided with a mouth piece 44 for the operator to blow into or connected through a push button valve to a source of compressed air.

In the operation of the apparatus, the glass envelope 10 to be bent is first inserted in the holders 33 and centered or otherwise adjusted longitudinally therein to the proper position for bending. The rubber tubing 43 is then connected to the open exhaust tube 34, after which the gas burners 39 are swung to their envelope-heating position to thereby heat and soften the portions of the glass envelope lying in and adjacent to the transverse plane including the pivot axis P of the arms 1. During the heating and softening of the envelope 10, air or other gaseous medium is introduced as needed into the envelope, through the rubber tubing 43 and exhaust tube 34, to prevent collapsing of the softened portion of the envelope. When the glass envelope has been softened to the required degree for proper bending, the burners 39 are swung to one side to discontinue the heating of the envelope whereupon first the foot pedal 15 is depressed to move the forming pin 9 forwardly to its advanced position overlying the envelope and then the other foot pedal 30 immediately depressed to swing the swivel arms 1 upwardly to a vertical side-by-side position as indicated by the arrows in Fig. 1, thus bending the glass envelope 10 around the forming pin 9 into the U-shape shown in Fig. 5.

The forming pin 9 serves to round out the glass at the inner side of the bend as indicated at 45 in Fig. 5. The pin 9 thus prevents the formation of an overly sharp bend in the glass at the inner side of the bend. Such a sharp bend would cause the glass to buckle or corrugate at the inner side of the bend due to the excessive compression of the plastic glass at such region. The forming pin 9 eliminates this condition by shaping the glass into a bend 45 of larger radius than it otherwise would have if the forming pin were not present.

What I claim as new and desire to secure by Letters Patent of the United States is:

1. Glass tube bending apparatus comprising a support member carrying a forming pin having a fixed operating position on said support member, tube holding means having spaced apart portions thereof on opposite sides of said pin constructed and arranged to grip a tube and hold it across the said pin and offset to one side thereof, the said portions of said holding means being mounted on said support member for simultaneous swinging movement in opposite directions about a common axis offset to the same side of the tube as the said pin to bend the tube around the pin while the latter is fixed in its said operating position, and means for heating and softening a zone of said tube adjacent the said pin prior to the swinging movement of said portions of the holding means.

2. Glass tube bending apparatus comprising a support member carrying a pivot pin, a pair of swivel arms each mounted at one end on said pin to normally extend therefrom in opposite directions, means on said arms for gripping a glass tube and supporting it in a position such that it extends along the faces of the arms and offset from the axis of said pin, and means for heating and softening a zone of the tube adjacent said pivot pin, said arms being arranged to be swung in a direction opposite to that in which the tube is offset from the pin axis.

3. Glass tube bending apparatus comprising a support member, a pair of swivel arms each pivotally mounted at one end on said support member to pivot about a common axis, said arms normally extending oppositely away from each other and having means for gripping a glass tube and supporting it in a position extending alongside the arms and offset from their pivot axis, means for heating and softening a zone of the tube adjacent the pivot axis of said arms, and a forming pin arranged to be positioned across the tube on the same side thereof as the pivot axis of the arms, said arms being arranged to be swung about their pivot axis in a direction to bend the tube around the said pin.

4. Glass tube bending apparatus comprising a support member, a pair of swivel arms each pivotally mounted at one end on said support member to pivot about a common axis, said arms normally extending oppositely away from each other and having means for gripping a glass tube and supporting it in a position extending alongside the arms and offset from their pivot axis, means for heating and softening a zone of the tube adjacent the pivot axis of said arms, and a forming pin extending transversely of the plane of pivotal movement of said arms and movable longitudinally from a normally retracted position removed from the glass tube supported on said arms to an advanced operative position contiguous to and extending across the tube on the same side thereof as the pivot axis of the arms, said arms being arranged to be swung about their pivot axis in a direction to bend the tube around the said pin.

5. Glass tube bending apparatus comprising a support member, a pair of swivel arms each pivotally mounted at one end on said support member to pivot about a common axis, said arms normally extending oppositely away from each other and having means for gripping a glass tube and supporting it in a position extending alongside the arms and offset from their pivot axis, means for heating and softening a zone of the tube adjacent the pivot axis of said arms, a forming pin extending transversely of the plane of pivotal movement of said arms and normally located in a retracted position removed from the glass tube supported on said arms, and pin actuating means for moving said pin longitudinally from its said retracted position to an advanced operative position contiguous to and extending across the tube on the same side thereof as the pivot axis of the arms, said arms being arranged to be swung about their pivot axis in a direction to bend the tube around the said pin.

6. Glass tube bending apparatus comprising a support member, a pair of swivel arms each pivotally mounted at one end on said support member to pivot about a common axis, said arms normally extending oppositely away from each other and having means for gripping a glass tube and supporting it in a position extending alongside the arms and offset from their pivot axis, means for heating and softening a zone of the tube adjacent the pivot axis of said arms, a forming pin extending transversely of the plane of pivotal movement of said arms and normally located in a retracted position removed from the glass tube supported on said arms, pin actuating means coacting with the said forming pin to move it longitudinally from its said retracted position to an advanced operative position contiguous to and extending across the tube on the same side thereof as the pivot axis of the arms, and arm pivoting means connected to said arms for pivoting them about their pivot axis in a direction to bend the tube around the said pin.

ALFRED GREINER.

REFERENCES CITED

The following references are of record in the file of this patent:

UNITED STATES PATENTS

| Number | Name | Date |
|---|---|---|
| 785,082 | Brinkman | Mar. 21, 1902 |
| 2,420,119 | Boehm et al. | May 6, 1947 |